United States Patent
Kawa

(10) Patent No.: US 9,667,773 B2
(45) Date of Patent: May 30, 2017

(54) AUDIO FILE MANAGEMENT FOR AUTOMATED SYNCHRONIZATION OF AN AUDIO TRACK WITH EXTERNAL VIDEO PLAYBACK

(71) Applicant: Theater Ears, LLC, Boca Raton, FL (US)

(72) Inventor: Larry A. Kawa, Boca Raton, FL (US)

(73) Assignee: THEATER EARS, LLC, Boca Raton, FL (US)

( * ) Notice: Subject to any disclaimer, the term of this patent is extended or adjusted under 35 U.S.C. 154(b) by 86 days.

(21) Appl. No.: 14/601,201

(22) Filed: Jan. 20, 2015

(65) Prior Publication Data

US 2016/0212306 A1    Jul. 21, 2016

(51) Int. Cl.
| | |
|---|---|
| G06F 17/00 | (2006.01) |
| H04M 1/725 | (2006.01) |
| G06F 3/0484 | (2013.01) |
| G06F 3/0482 | (2013.01) |
| H04N 5/04 | (2006.01) |
| H04N 5/775 | (2006.01) |

(Continued)

(52) U.S. Cl.
CPC ...... *H04M 1/72577* (2013.01); *G06F 3/0482* (2013.01); *G06F 3/0484* (2013.01); *G06F 17/30746* (2013.01); *H04M 1/72527* (2013.01); *H04M 1/72569* (2013.01); *H04M 1/72572* (2013.01); *H04N 5/04* (2013.01); *H04N 5/775* (2013.01); *H04N 5/7755* (2013.01); *H04N 5/9305* (2013.01); *H04N 21/4126* (2013.01); *H04N 21/42203* (2013.01); *H04N 21/4307* (2013.01); *H04N 21/8106* (2013.01)

(58) Field of Classification Search
CPC ......... H04N 21/4307; H04N 21/41407; H04N 21/42203; H04N 21/4622; H04N 21/8106; H04N 21/8358; G03B 31/04
See application file for complete search history.

(56) References Cited

U.S. PATENT DOCUMENTS

2005/0228859 A1* 10/2005 Maeda .............. H04N 5/91
    709/203
2013/0031598 A1* 1/2013 Whelan .............. G01S 1/725
    726/1

(Continued)

Primary Examiner — Thomas Maung
(74) Attorney, Agent, or Firm — Steven M. Greenberg, Esq.; CRGO Law

(57) ABSTRACT

Embodiments of the invention provide for audio file management for synchronized audio playback in coordination with external video playback. In an embodiment of the invention, a method for audio file management for synchronized audio playback in coordination with external video playback includes receiving a request to synchronize playback of an audio file locally stored in a mobile device with audio resulting from projection of a motion picture in a movie theater. The method additionally includes synchronizing playback of the audio file with the audio resulting from the projection of the motion picture in response to receiving the request. The method yet further includes determining that the synchronized playback of the audio file in the mobile device has completed. Finally, the method includes responding to the determination, by irretrievably modifying the audio file in the mobile device and by subsequently deleting the irretrievably modified audio file from the mobile device.

6 Claims, 2 Drawing Sheets

(51) Int. Cl.
*G06F 17/30* (2006.01)
*H04N 5/93* (2006.01)
*H04N 21/41* (2011.01)
*H04N 21/422* (2011.01)
*H04N 21/43* (2011.01)
*H04N 21/81* (2011.01)

(56) References Cited

U.S. PATENT DOCUMENTS

2013/0268740 A1* 10/2013 Holt ................. G06F 21/00
  711/163
2013/0272672 A1* 10/2013 Padro Rondon ....... G03B 31/04
  386/201
2015/0025663 A1* 1/2015 Cameron ................ G06F 3/165
  700/94

* cited by examiner

AUDIO FILE MANAGEMENT FOR AUTOMATED SYNCHRONIZATION OF AN AUDIO TRACK WITH EXTERNAL VIDEO PLAYBACK

CROSS-REFERENCE TO RELATED APPLICATIONS

This application is a Continuation-in-Part of U.S. application Ser. No. 14/501,625, filed on Sep. 30, 2014, presently pending, the entire teachings of which are incorporated herein by reference.

BACKGROUND OF THE INVENTION

Field of the Invention

The present invention relates to audio playback in a mobile device and more particularly to audio playback in coordination with external video playback.

Description of the Related Art

Video playback refers to the presentation on a display substrate of previously recorded video imagery. Historically, video playback included merely the projection of a multiplicity of frames stored in a pancake of film onto screen—typically fabric. Audio playback simultaneously occurred with the playback of video imagery in a coordinated fashion based upon the transduction of optical patterns imprinted upon the film in association with one or more frames of imagery also imprinted upon the film. Thus, the coordination of playback of both audio and video remained the responsibility of a single projection device in the context of traditional film projection.

Unlike motion pictures, in the scholastic environment and even in the context of modern visual presentations, visual playback of a series of images such as a slide show occur separately from the playback of accompanying audio. In this regard, it is customary for the presenter to initiate playback, and in response to a particular cue, such as the presentation of a slide that states, "press play now", the presenter can manually initiate playback of an audio cassette to audibly supplement the presentation of a series of slides in the slide show. However, the necessity of precision in coordinating the playback of the audio cassette with the presentation of different slides is lacking in that each slide of the slide show may remain visible on a presentation screen for an extended duration.

Coordinating the playback of audio separately from the projection of a film in a movie theater is not a problem of present consideration because modern file projectors manage both audio and video playback. However, circumstances arise where external audio may be desired in supplement to or in replacement of the audio inherently present during the projection of a film. For example, for an audience member who comprehends a language other than the language of a presented film and other audience members, it is desirable to simulcast audio of a language native to the audience member in lieu of the audio of the presented film that differs from the language of the audience member. Yet, coordinating the synchronized playback of the supplemental audio with the playback of the video without the cooperation of the projectionist of the film can be a manually intensive process of timing the initiation of the playback of the supplemental audio in respect to a particular cue of the film.

Of note, the use of a mobile device to support synchronized audio playback within a theater environment is disfavored. In particular, recording devices are strictly prohibited by most if not all movie theaters so as to avoid the filming of a motion picture for subsequent unauthorized re-distribution to others. Yet, most mobile devices include audio and video recording functionality. Also, the audio tracks utilized as supplemental audio are costly to acquire and therefore, susceptible to piracy. To the extent that an audio track is stored on a mobile device, the subsequent unauthorized distribution of the audio file from the mobile device to an unauthorized party is cause for alarm for the film provider and the movie theater.

BRIEF SUMMARY OF THE INVENTION

Embodiments of the present invention address deficiencies of the art in respect to the use of a mobile device during audio playback synchronized with external video playback and provide a novel and non-obvious method, system and computer program product for audio file management for synchronized audio playback in coordination with external video playback. In an embodiment of the invention, a method for audio file management for synchronized audio playback in coordination with external video playback includes receiving a request to synchronize playback of an audio file locally stored in a mobile device with audio resulting from projection of a motion picture in a movie theater. The method additionally includes synchronizing playback of the audio file with the audio resulting from the projection of the motion picture in response to receiving the request. The method yet further includes determining that the synchronized playback of the audio file in the mobile device has completed. Finally, the method includes responding to the determination, by irretrievably modifying the audio file in the mobile device and by subsequently deleting the irretrievably modified audio file from the mobile device.

In one aspect of the embodiment, the irretrievable modification includes selecting multiple different portions of the audio file and generating a different random number for each of the multiple different portions. Thereafter, each selected portion is changed to a value based upon a correspondingly generated one of the different random numbers. In another aspect of the embodiment, a location of the mobile phone during the synchronized playback is determined and the irretrievable modification of the audio file is performed not only in response to the determination that the synchronized playback of the audio file has completed, but also in response to a determination that the mobile phone is no longer located within a threshold distance of the determined location. In yet another aspect of the embodiment, a start time associated with the projection of the motion picture is determined and an end time is computed based upon a known duration of the motion picture. Thereafter, the irretrievable modification of the audio file is performed not only in response to the determination that the synchronized playback of the audio file has completed, but also in response to a determination that a threshold period of time has elapsed since the end time.

In another embodiment of the invention, a data processing system is configured for audio file management for synchronized audio playback in coordination with external video playback. The system includes a mobile computing device that has at least one processor, memory, cellular telephony circuitry and a display. The system also includes an audio synchronization module executing in the memory of the mobile computing device. The module includes program code enabled to respond to a request to synchronize playback of an audio file stored locally in the mobile device with a presentation of a motion picture onto a screen in a movie theater, by synchronizing playback of the audio file through the mobile device with audio resulting from the projection of the motion picture, by determining that the synchronized playback of the audio file in the mobile device has completed, and by irretrievably modifying the audio file in the mobile device and subsequently deleting the irretrievably modified audio file from the mobile device in response to the determination.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for audio file management for synchronized audio playback in coordination with external video playback. In accordance with an embodiment of the invention, a request to synchronize playback of an audio file with the projection of a film on a screen can be received in the memory of a mobile device positioned proximately to the screen. In response to the request, a particular audio file stored in a data store of the mobile device can be selected for playback and a particular starting position within the audio file can be selected based upon detected audio resulting from the projection of the file. Once the playback of the audio file has completed, the audio file can be irretrievably modified and then deleted. In this way, any subsequent unauthorized distribution of the audio file can be prevented.

Figure 1:
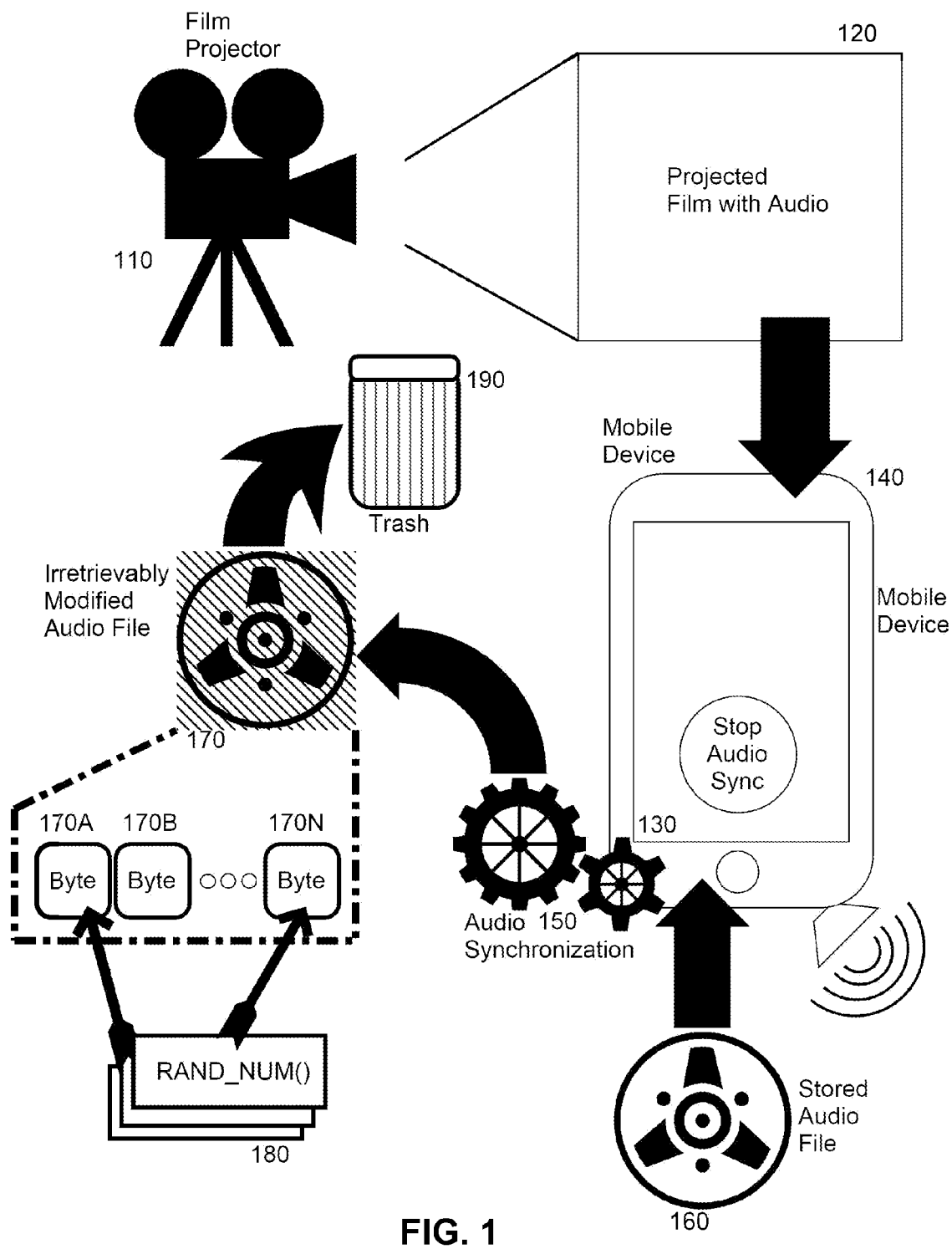
FIG. 1 is a pictorial illustration of a process for audio file management for synchronized audio playback in coordination with external video playback.

In further illustration, FIG. 1 pictorially shows a process for audio file management for synchronized audio playback in coordination with external video playback. As shown in FIG. 1, a film projector 110 can project a motion picture onto a screen 120 such as is the case in a movie theater. A mobile device 140 in proximity to the screen 120 can host the execution of audio synchronization logic 150. The synchronization logic 150 during execution can present a user interface in a display 130 of the mobile device 140 with a control in response to the activation of which, the audio synchronization logic 150 can direct the mobile device 140 to transduce the audio of the projected file for use by the audio synchronization logic 150 in synchronizing the playback of a stored audio file 160 through an audio output device of the mobile device 140. In this regard, the stored audio file can be substantially equivalent to the audio of the film projected onto the screen 120 excepting that the stored audio file 160 can be of a different language.

Of note, subsequent to the playback of the stored audio file 160, the audio synchronization logic 150 can irretrievably modify the stored audio file 160 into an irretrievably modified audio file 170. For instance, different portions or all portions 170A, 170B, 170N of the stored audio file 160 can be modified utilizing different random numbers 180. The modification can include performing a one-way hash of each of the bytes 170A, 170B, 170N using a corresponding one of the random numbers 180, by way of example. Thereafter, the audio synchronization logic 150 can delete the irretrievably modified audio file 170 from the mobile device 140 by placing the irretrievably modified audio file 170 into the local trash 190 portion of fixed storage. Additionally, the audio synchronization logic 150 can direct the emptying of the trash 190. In this way, even if the irretrievably modified audio file 170 is surreptitiously recovered from the trash 190, the irretrievably modified audio file 170 itself lacks the meaningful content of the stored audio file 160 rendering the irretrievably modified audio file 170 useless in terms of its audio content.

Figure 2:
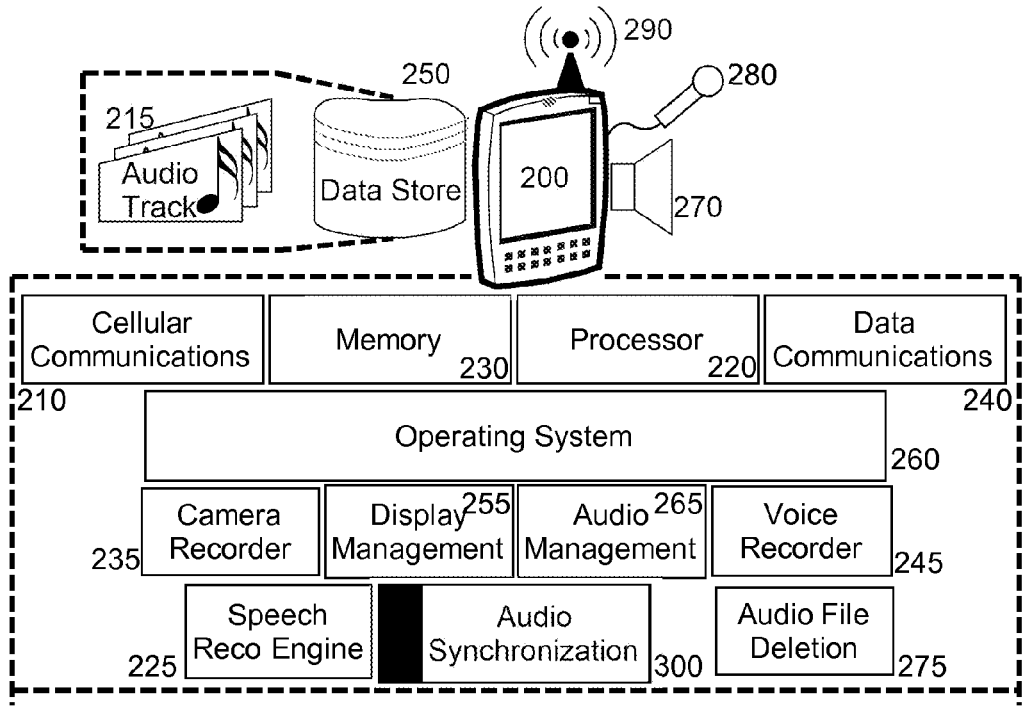
FIG. 2 is a schematic illustration of a data processing system configured for audio file management for synchronized audio playback in coordination with external video playback; and, FIG. 3 is a flow chart illustrating a process for audio file management for synchronized audio playback in coordination with external video playback.

The process described in connection with FIG. 1 can be implemented in a data processing system. In further illustration, FIG. 2 schematically shows a data processing system configured for audio file management for synchronized audio playback in coordination with external video playback. The system can include a mobile device 200, for instance a smart phone, tablet computer or personal digital assistant. The mobile device 200 can include at least one processor 220 and memory 230. The mobile device 200 additionally can include cellular communications circuitry 210 arranged to support cellular communications in the mobile device 200, as well as data communications circuitry 240 arranged to support data communications.

An operating system 260 can execute in the memory 230 by the processor 220 of the mobile device 200 and can support the operation of a number of computer programs, including a camera recorder 235 and a voice recorder 245. Further, a display management program 255 can operate through the operating system 260 as can an audio management program 265. Of note, an audio synchronization module 300 can be hosted by the operating system 260. The audio synchronization module 300 can include program code that, when executed in the memory 230 by the operating system 260, can act to synchronize the playback through audio output circuitry 270 of a selected audio track 215 in data store 250 of the mobile device 200 in supplement to an externally projected motion picture.

In this regard, the program code of the audio synchronization module 300 is enabled to detect external audio provided by the projection of a motion picture through microphone 280. Speech recognition engine 225 also executing in the memory 230 by the operating system 260 can process the external audio to compare the resultant text to a known textual fingerprint so as to determine a position of the audio track to play back in synchronization with the detected external audio. Periodically, the program code of the audio synchronization module 300 can detect contemporaneously broadcast external audio provided by the projection of the motion picture. The detected audio again can be speech recognized by the speech recognition engine 225 so as to produce text for comparison with a known transcription of audio of the motion picture. Based upon the matching of the speech recognized text to text in the transcription, the program code of the audio synchronization module 300 is able to precisely locate a contemporaneous position of the detected external audio so as to coordinate the precise location in the audio track 215 to be played back through the audio output circuitry 270.

Importantly, the program code of the audio synchronization module 300 is enabled to irretrievably modify and delete the selected audio track 215 from the data store 250. In this regard, audio file deletion routine 275 can be accessed by the audio synchronization module 300 so as to initially respond to the termination of audio synchronized playback of the selected audio track 215 by selecting and modifying different portions of the selected audio track 215 utilizing random data. In particular, for each of one or more selected portions of the selected audio track 215, a random number can be generated and used in one or more predetermined mathematical operations in which the value of the selected portion of the audio track 215 and the generated random number are supplied as inputs so as to produce an output value. The selected portion of the selected audio track 215 then is assigned the output value. As such, the resultant file no longer contains the audio content of the audio track 215. Thereafter, the program code of the synchronization module 300 deletes the resultant file from the data store 250.

Figure 3:
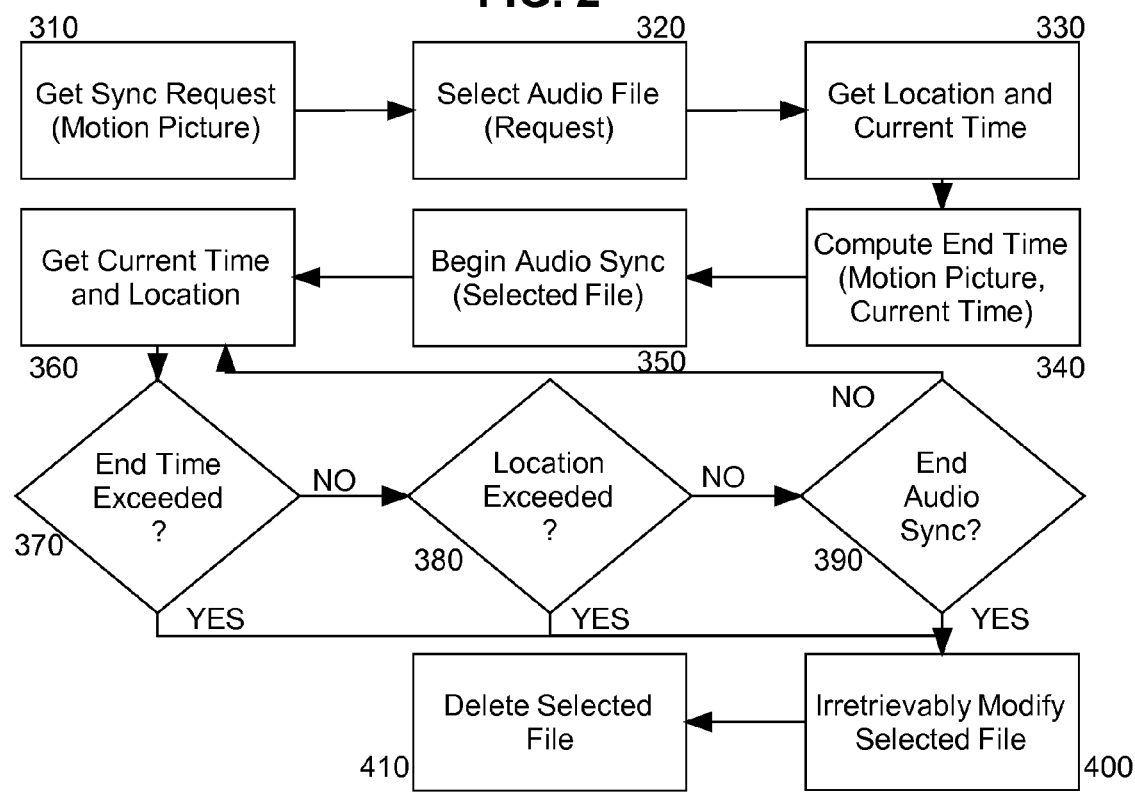

In even yet further illustration of the operation of the audio synchronization module 300, FIG. 3 is a flow chart illustrating a process for audio file management for synchronized audio playback in coordination with external video playback. Beginning in block 310, a synchronization request is received to perform the synchronized playback of a stored audio file in connection with audio detected during projection of a motion picture in a theater. In block 320, an audio file corresponding to the request is selected and in block 330, a current location of the mobile device and a current time is determined. In block 340, a projected end time is computed for the motion picture based upon the current time and a known duration of the motion picture.

In block 350, the synchronized playback of the audio file is performed. During the synchronized playback, in block 360 a new current time and location can be obtained. In decision block 370, if the newly determined current time exceeds the end time by a pre-specified threshold value, then in block 400 the audio file is irretrievably modified and in block 410, the irretrievably modified file is deleted from the data store of the mobile device. Likewise, in decision block 380, if the newly determined location exceeds the location at the commencement of playback by a pre-specified threshold value, then in block 400 the audio file is irretrievably modified and in block 410, the irretrievably modified file is deleted from the data store of the mobile device. Finally, in decision block 390, if it is determined that the synchronized playback has completed, then in block 400 the audio file is irretrievably modified and in block 410, the irretrievably modified file is deleted from the data store of the mobile device.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A method for audio file management by a mobile device for synchronized audio playback in coordination with external video playback, the method comprising:
   receiving a request to synchronize playback of an audio file locally stored in the mobile device with audio resulting from projection of a motion picture onto a screen in a movie theater;
   determining a start time associated with the projection of the motion picture and computing an end time based upon a known duration of the motion picture;
   synchronizing playback of the audio file with the audio resulting from the projection of the motion picture in response to receiving the request by periodically speech recognizing into text the audio resulting from the projection of the motion picture onto the screen, comparing the text to a known textual transcription of the audio resulting from projection of the motion picture and determining a position within the audio file to play back in synchronization with the audio resulting from the projection of the motion picture;
   determining that the synchronized playback of the audio file in the mobile device has completed and that a threshold period of time has elapsed since the end time; and,
   responding to the determination that synchronized playback of the audio file already stored on the mobile device has completed and that a threshold period of time has elapsed since the end time, by irretrievably modifying the audio file stored in the mobile device prior to initiating deletion of the audio file by selecting multiple different portions of the audio file, generating a different random number for each of the multiple different portions, and changing each selected portion to a value based upon a correspondingly generated one of the different random numbers, and subsequently deleting the irretrievably modified audio file from the mobile device.

2. The method of claim 1, further comprising:
   determining a location of the mobile device during the synchronized playback; and,
   performing the irretrievable modification of the audio file not only in response to the determination that the synchronized playback of the audio file has completed, but also in response to a determination that the mobile device is no longer located within a threshold distance of the determined location.

3. A data processing system configured for audio file management for synchronized audio playback in coordination with external video playback, the system comprising:
    a mobile computing device comprising at least one processor, memory, cellular telephony circuitry and a display; and,
    an audio synchronization module executing in the memory of the mobile computing device, the module comprising program code enabled to respond to a request to synchronize playback of an audio file stored locally in the mobile computing device with a presentation of a motion picture onto a screen in a movie theater, by determining a start time associated with the projection of the motion picture and computing an end time based upon a known duration of the motion picture, synchronizing playback of the audio file through the mobile computing device with audio resulting from the projection of the motion picture by periodically speech recognizing into text the audio resulting from the projection of the motion picture onto the screen, comparing the text to a known textual transcription of the audio resulting from projection of the motion picture and determining a position within the audio file to play back in synchronization with the audio resulting from the projection of the motion picture, by determining that the synchronized playback of the audio file in the mobile computing device has completed and that a threshold period of time has elapsed since the end time, and by responding to the determination that the synchronized playback of the audio file already stored on the mobile computing device has completed and that a threshold period of time has elapsed since the end time by irretrievably modifying the audio file stored in the mobile computing device prior to initiating deletion of the audio file by selecting multiple different portions of the audio file, generating a different random number for each of the multiple different portions, and changing each selected portion to a value based upon a correspondingly generated one of the different random numbers, and subsequently deleting the irretrievably modified audio file from the mobile computing device in response to the determination.

4. The system of claim 3, wherein the program code is further enabled to:
    determine a location of the mobile computing device during the synchronized playback; and,
    perform the irretrievable modification of the audio file not only in response to the determination that the synchronized playback of the audio file has completed, but also in response to a determination that the mobile computing device is no longer located within a threshold distance of the determined location.

5. A computer program product for audio file management for synchronized audio playback in coordination with external video playback, the computer program product comprising a non-transitory computer readable storage medium having program instructions embodied therewith, the program instructions executable by a mobile device to cause the mobile device to perform a method comprising:
    receiving a request to synchronize playback of an audio file locally stored in the mobile device with audio resulting from projection onto a screen of a motion picture in a movie theater;
    determining a start time associated with the projection of the motion picture and computing an end time based upon a known duration of the motion picture;
    synchronizing playback of the audio file with the audio resulting from the projection of the motion picture in response to receiving the request by periodically speech recognizing into text the audio resulting from the projection of the motion picture onto the screen, comparing the text to a known textual transcription of the audio resulting from projection of the motion picture and determining a position within the audio file to play back in synchronization with the audio resulting from the projection of the motion picture;
    determining that the synchronized playback of the audio file in the mobile device has completed and that a threshold period of time has elapsed since the end time; and,
    responsive to the determination that synchronized playback of the audio file already stored on the mobile device has completed and that a threshold period of time has elapsed since the end time, by irretrievably modifying the audio file stored in the mobile device prior to initiating deletion of the audio file by selecting multiple different portions of the audio file, generating a different random number for each of the multiple different portions, and changing each selected portion to a value based upon a correspondingly generated one of the different random numbers, and subsequently deleting the irretrievably modified audio file from the mobile device.

6. The computer program product of claim 5, wherein the method further comprises:
    determining a location of the mobile device during the synchronized playback; and,
    performing the irretrievable modification of the audio file not only in response to the determination that the synchronized playback of the audio file has completed, but also in response to a determination that the mobile device is no longer located within a threshold distance of the determined location.

\* \* \* \* \*